(No Model.) 2 Sheets—Sheet 2.
L. S. BACHE.
SPLIT WHEEL.
No. 536,121. Patented Mar. 19, 1895.
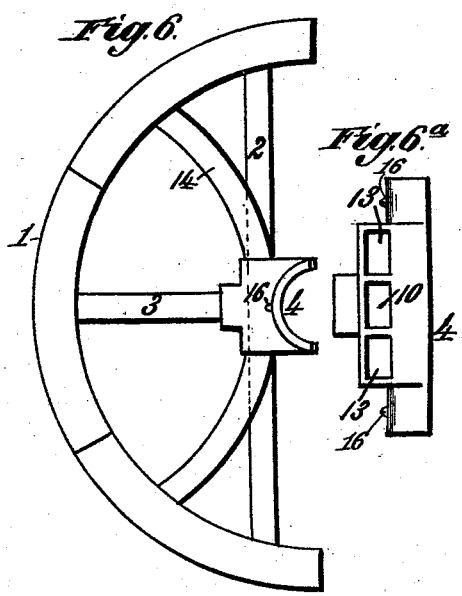
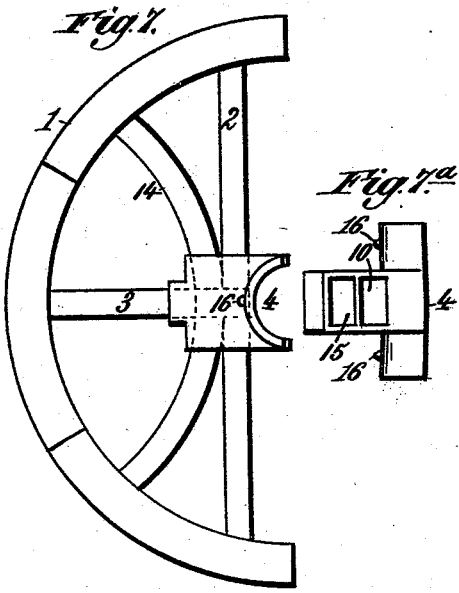
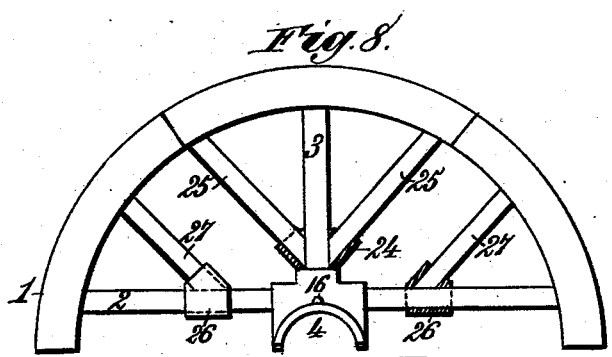
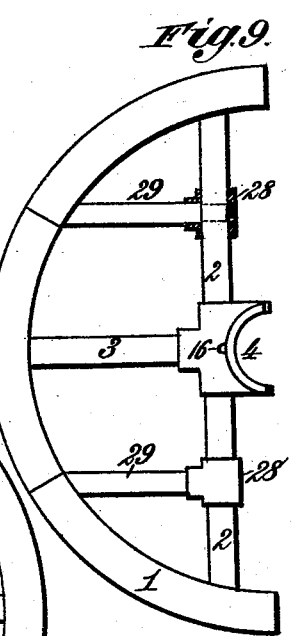
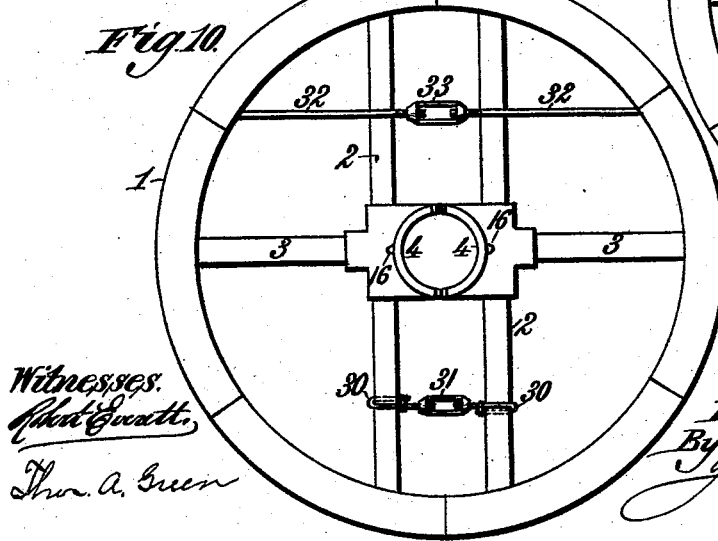
Witnesses.
Inventor.
Leigh S. Bache.
By James L. Norris.
Atty.

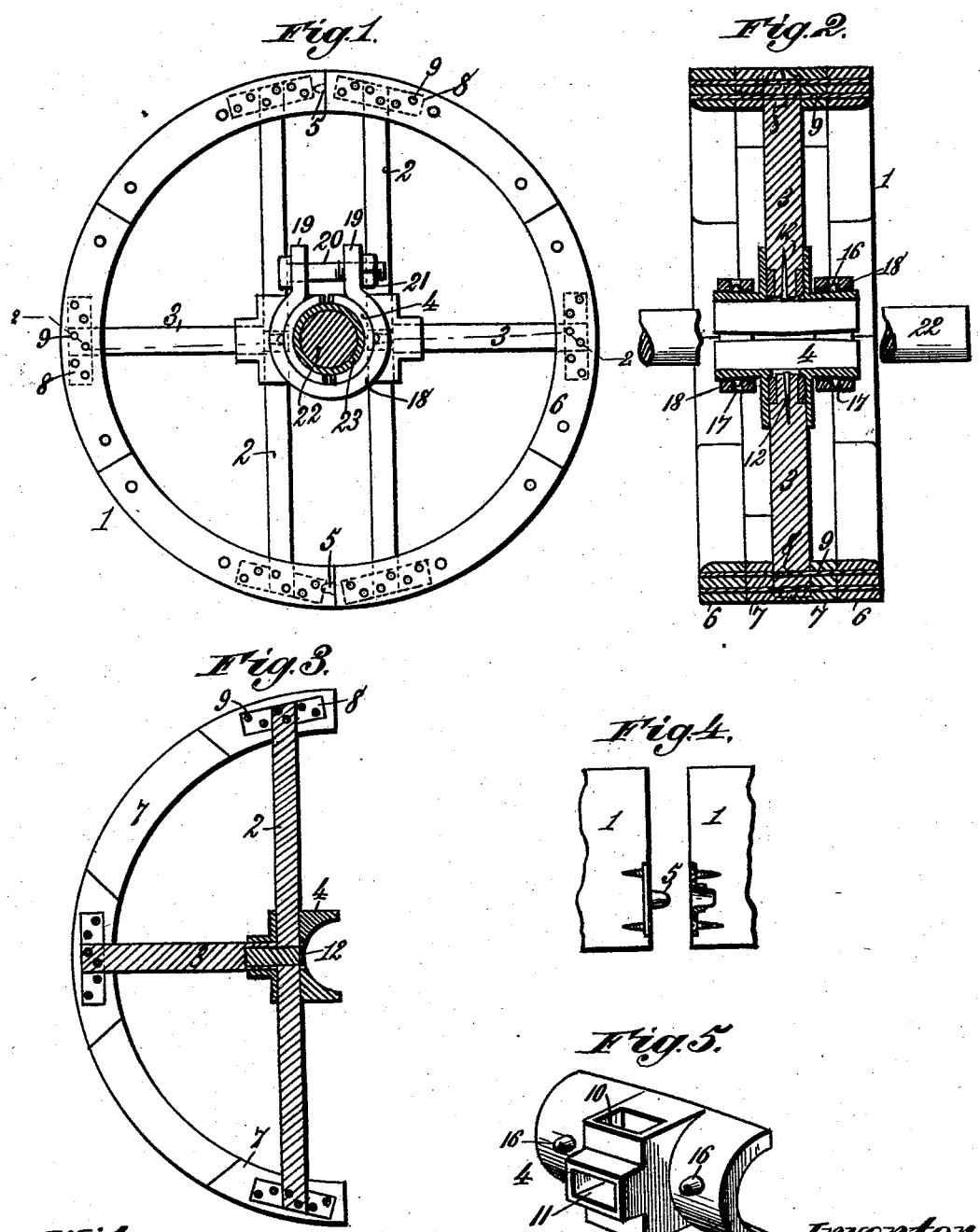

UNITED STATES PATENT OFFICE.

LEIGH S. BACHE, OF BOUND BROOK, NEW JERSEY.

SPLIT WHEEL.

SPECIFICATION forming part of Letters Patent No. 536,121, dated March 19, 1895.

Application filed December 6, 1894. Serial No. 531,027. (No model.)

*To all whom it may concern:*

Be it known that I, LEIGH S. BACHE, a citizen of the United States, residing at Bound Brook, in the county of Somerset and State of New Jersey, have invented new and useful Improvements in Split Pulleys or other Wheels, of which the following is a specification.

This invention relates to split pulleys and other wheels, in which the rim and the hub are each bisected or composed of separable sections to facilitate connection with and removal from a shaft or axle and to permit a quick adjustment of the wheel or pulley upon its shaft for use either as a fast pulley or wheel, or as a loose one, with capability of being readily changed from one to the other.

The object of my invention is to improve the construction and connections of the several parts of a split pulley or wheel with a view to increasing its strength and durability, and to this end the invention consists in the features of construction and novel combination of parts as hereinafter more particularly described and claimed.

In the annexed drawings illustrating the invention—Figure 1, is a side elevation of a split pulley embodying my improvements, with shaft and bushing in section. Fig. 2 is a section of the split pulley or wheel on the line 2—2 of Fig. 1. Fig. 3 is a partly sectional view of one of the pulley halves. Fig. 4, is an enlarged part sectional view of abutting portions of the two rim sections. Fig. 5, is a perspective of one of the hub half-sections. Figs. 6, 6ª, 7 and 7ª show constructions in which the pulley hub is provided with sockets for additional spoking. Figs. 8 and 9, show the principal spokes of the pulley as provided with sockets for insertion of bracing spokes or arms. Fig. 10, is a side elevation of the split pulley provided with bracing and tension attachments.

Referring to the drawings, the numeral 1 designates either one of the two equal parts or sections of the pulley rim, each of which has the usual semi-circular form and is connected by spokes 2 and 3 with the half-section 4 of the hub.
The rim 1 of the pulley is split, or divided, diametrically, and the abutting edges are provided on one part with dowel pins 5 that are adapted to engage into corresponding mortises in the other half-section, to secure an accurate relative adjustment of the parts or sections of the pulley when united. The pulley rim may have any required diameter, thickness and width; and may be made of wood or other material. Each half-section of the rim 1 is composed of a number of outermost segments 6, on each side, and a number of inner or intermediate segments 7 which may comprise one or more rows according to the width of the rim.

The rows of segments 6 and 7 are, preferably, arranged to break joints and each segment is suitably cut or beveled at its ends to have an abutting fit with adjoining segments in the same row. At the points where the spokes are to connect with the rim, the inner segments of the rim may be suitably cut or mortised to receive the outer ends of the spokes, each of which is bifurcated, or recessed in a central line, to receive a metal plate 8, let into or between the rim segments and secured by nails, screws, pins or bolts 9 to said segments and to the spoke end in such manner as to form a firm and reliable fastening.

It is preferable to connect directly to the outer ends of the spokes those segments that are of greatest length on the outer periphery of the rim, so that the intervening segments, not directly attached to the spokes, will have their greatest length on the inner periphery, and thus the wedging action of adjoining segments will be exerted in such direction as will most effectually render it impossible for the pulley to fly apart under whatever conditions it may be running. In addition to this wedging connection of the segments composing each half-section of the wheel or pulley rim the segments in the several rows will, of course, be secured together by transversely arranged nails, bolts or other fastenings.

Each half-section of the wheel or pulley is provided with a main spoke 2 arranged parallel with the line on which the wheel or pulley is divided. This main spoke 2 is extended from one side of the rim to the other and its central portion is passed through and closely fitted into a socket 10 formed onto the corresponding half-section of the hub. At a right angle to each main spoke 2 may be arranged a spoke 3 having its inner end fitted into and extended through an appropriate hub socket 11 and through a mortise or slot in the center of the main spoke, and thence to the inner side of the hub. A wedge 12 may be driven into the inner end of the spoke 3 and is, preferably, arranged with its greatest width in the direction of the length of the main spoke 2, thus serving to firmly secure both spokes within their hub sockets.

For a wheel or pulley of large size or increased width, where additional spoking may sometimes be required, the hub 4 may be provided with a socket or sockets 13, at one or both sides of the main spoke, to provide attachment for curved spokes, or a single continuous curved spoke, 14; or the hub may be somewhat extended toward the pulley rim to provide sockets 15 in which the additional or curved spoke, or spokes, 14 may be inserted and thus occupy a position upon the main spokes 2 instead of at the side. It is obvious that a curved spoke 14 may extend in a continuous piece from one side of the pulley or wheel rim to the other side, or it may be formed in two pieces, as preferred. If formed in a continuous piece and placed in the socket 15 upon or over the main spoke, it may be provided with a central mortise or slot for passage of the spoke 3 in case the latter spoke is also used. Thus it will be apparent that the curved spokes 14 may be used either in lieu of the spokes 3 or together therewith. The spokes 3 may be reduced in diameter at their inner socketed ends and these may be either square or cylindrical, as desired.

The hub half-sections 4 are made of metal and each provided with the spoke sockets as shown and described. Each semi-cylindrical portion or end of each hub half-section has its external diameter slightly decreased or tapered from the outer end of the hub toward the spokes and on each of these tapered surfaces is cast a nib or projection 16 in position to correspond with and enter perforations 17 formed in the yoke shaped clamps 18 that are to connect the two parts or sections of the hub and hold the wheel or pulley upon its shaft. These clamps 18 are each formed of a single piece of metal with substantially parallel end portions or arms 19 through which is passed a bolt 20 having a nut 21 on one end. By screwing up the nuts 21 the clamps 18 may be compressed upon the sections of the divided hub so as to lock it onto the shaft 22 with any required force. The inwardly tapered diameter of the hub ends and the nibs or projections 16 formed thereon and engaging the clamps will retain the clamps in position even when the nuts 21 are somewhat loosened. The adjacent edges of the hub half-sections 4 may be dressed off in such manner as to cause said edges to have a slight divergence from the center to the outer ends of the hub and thus provide for a slight yielding of the hub-sections at their ends, to facilitate clamping them upon the shaft. It is obvious that by merely tightening or loosening the nuts 21 on the bolts 20, the pulley may be made fast or loose upon the shaft 22, and by slightly turning up said nuts, from time to time, the wear to which the parts are subjected by long continued use may be easily compensated. In applying the pulley to shafts of varying diameters, or in changing it from one shaft to another of different diameter, a bushing 23, preferably composed of a compound of wood-pulp, asbestos and cement, may be employed to secure an accurate fit.

In making the bushings 23, I first take a sufficient quantity of wood pulp and press it out flat. On this I place a coating of cement (made from glue, white lead or other suitable material) and on top of the cement I place a layer of asbestos, either in sheet form or sprinkled on in the form of powder and in such manner that it will adhere to the cement. The layers of wood pulp, cement and asbestos are then pressed together and, after drying, the compound body is formed into the desired shape and dimensions for a bushing of the required size and form, either cylindrical or semi-cylindrical, to suit the bore of the pulley and the diameter of the shaft to be engaged therewith. The wood pulp and asbestos may be employed in about equal proportions, with sufficient cement to hold them together.

In some pulleys of large dimensions, or where great strength is required, I may secure cast-metal socket pieces or couplings 24 onto the spokes 3 for connection with oppositely diagonal spokes or braces 25 extended to and connected with the rim of the pulley or wheel. The main spokes 2 may, also, have secured thereto the socket pieces or couplings 26, projecting from one side only of said main spokes, to receive the additional spokes or braces 27 which are also extended diagonally to the wheel or pulley rim.

Instead of the supplemental spokes or braces 25 and 27 and their sockets, there may be slipped onto each arm of the main spokes 2 a casting 28 having a socket projecting from one side for insertion of a bracing arm or spoke 29 that may be extended either diagonally or at right angles from the main spoke 2 and connect with the pulley rim. The main spoke may be mortised or recessed to receive the brace 29 and a wedge may be driven in at the bottom. These several means for bracing the split wheel or pulley, when of large size, may be replaced or supplemented by metal yokes 30 placed on the main spokes 2, at points intermediate the hub and rim, and connected by a turn-buckle attachment 31 for giving the wheel or pulley the required tensional strain; or opposite sides of the wheel or pulley rim may have tension rods 32 secured thereto and connected by a turn-buckle 33 for a similar purpose. These may be put into the pulley at such places, and as many of them, as may be found desirable. In large wheels or pulleys, both these forms of tension devices may be employed, at once, if desired.

Although I have illustrated my invention with reference to a pulley for transmitting power it will be understood that it is also applicable to various gears and wheels.

What I claim as my invention is—

1. In a split pulley or wheel, the combination of the two similar rim sections, the hub half sections having the projections 16 and provided with sockets 10 and 11, as described, the main spokes 2 extended through the sockets 10, the spokes 3 inserted into the sockets 11 at right angles to the main spokes, and having their inner ends passed through central mortises in said main spokes, the wedges 12 driven into the inner ends of the spokes 3, and the yoke shaped clamps 18 having perforations 17 engaged with the projections 16 on the hub half sections, substantially as described.

2. In a split pulley or wheel, the combination with the two similar rim sections and the hub half-sections provided with the spoke sockets, as described, of the main spokes 2 passed through the hub and extended across the wheel or pulley, the spokes 3 at right angles to the main spokes, the curved spokes 14, and the detachable yoke shaped clamps 18 fitted onto the ends of the hub-sections, substantially as described.

3. In a split pulley or wheel, the combination with the two similar rim sections, and the hub half sections provided with sockets, as described, of the spokes inserted into said sockets and having their outer ends bifurcated, the plates 8 inserted into the bifurcated outer ends of the spokes and bolted thereto and to the wheel rim, and the detachable clamps on the ends of the hub-sections, substantially as described.

4. In a split pulley or wheel, the combination with the two similar rim sections and the hub half-sections provided with the projections 16 and the spoke sockets, as described, of the main spokes 2 passed through the hub and extended across the wheel or pulley, the spokes 3 at right angles to the main spokes, means for bracing the rim and spokes, and the yoke shaped clamps 18 fitted onto the hub and provided with perforations 17 to engage the hub projections 16 and having clamping bolts 20 to connect the arms of said clamps, substantially as described.

5. In a split pulley or wheel, the combination with the two similar rim sections, each composed of series of wedging segments, the hub half-sections, and the spokes having their outer ends bifurcated, of the plates 8 inserted in the outer bifurcated ends of the spokes and bolted to the spokes and rim segments, and the clamps on the hub-sections, substantially as described.

6. In a split pulley or wheel, the combination with the two similar rim sections, the spokes, and the hub half-sections having their ends tapered on the outer surface inward to the spoke sockets and provided with the nibs or projections 16, of the yoke shaped clamps 18 fitted upon the said hub ends and provided with perforations 17 to engage the hub projections and with clamping bolts 20 to connect the arms of the clamps, for securing the wheel or pulley onto a shaft, substantially as described.

In testimony whereof I have hereunto set my hand and affixed my seal in presence of two subscribing witnesses.

LEIGH S. BACHE. [L. S.]

Witnesses:
 R. H. BROKAW,
 H. G. HERBERT.